United States Patent
Torres et al.

(10) Patent No.: US 8,379,655 B2
(45) Date of Patent: Feb. 19, 2013

(54) DATA NETWORK AND METHOD FOR EXECUTING FORKING

(75) Inventors: Jose Miguel Torres, Madrid (ES); Mala A. Shivaprasad, Bangalore (IN); Miguel Angel Munoz de la Torre, Alcorcon (ES); Luis F. Velarde, Madrid (ES)

(73) Assignee: Motorola Mobility LLC, Libertyville, IL (US)

( * ) Notice: Subject to any disclaimer, the term of this patent is extended or adjusted under 35 U.S.C. 154(b) by 675 days.

(21) Appl. No.: 12/538,243

(22) Filed: Aug. 10, 2009

(65) Prior Publication Data

US 2010/0054239 A1    Mar. 4, 2010

Related U.S. Application Data

(60) Provisional application No. 61/091,823, filed on Aug. 26, 2008.

(51) Int. Cl.
*H04L 12/66* (2006.01)
*G06F 15/16* (2006.01)

(52) U.S. Cl. ........................................ 370/401; 709/228
(58) Field of Classification Search ........................ None
See application file for complete search history.

(56) References Cited

U.S. PATENT DOCUMENTS

| | | | |
|---|---|---|---|
| 7,028,311 B2 * | 4/2006 | Roach et al. | 719/328 |
| 7,336,778 B2 * | 2/2008 | Partanen et al. | 379/211.02 |
| 7,680,481 B2 * | 3/2010 | Ejzak et al. | 455/406 |
| 7,912,963 B2 * | 3/2011 | Jackson | 709/227 |
| 2005/0144326 A1 * | 6/2005 | Sugar et al. | 709/247 |
| 2007/0070976 A1 * | 3/2007 | Mussman et al. | 370/351 |
| 2007/0121584 A1 * | 5/2007 | Qiu et al. | 370/352 |
| 2007/0204050 A1 * | 8/2007 | Liu et al. | 709/230 |
| 2008/0046573 A1 * | 2/2008 | Ropolyi et al. | 709/227 |
| 2008/0271113 A1 * | 10/2008 | Belling | 726/1 |
| 2009/0116623 A1 * | 5/2009 | Ku et al. | 379/45 |
| 2009/0156242 A1 * | 6/2009 | Wang | 455/466 |

\* cited by examiner

*Primary Examiner* — Gregory Sefcheck (57) ABSTRACT

A data network comprises proxy-call session control functions (P-CSCFs) serving user equipments. Each P-CSCF can request resource reservation from an associated policy manager. A serving-call session control function receives a first call session setup message and determines a set of terminating user equipments associated with a terminating user identity of the setup message. It then transmits a call session initialization message to each identified terminating user equipment via an associated P-CSCF. This message includes a session identity indication and a forking indication which indicates if the first call session is a forked call session. The P-CSCFs and/or the policy managers then restrict the resource reservation for two or more user equipments having the same session identity and forking indications indicative of a forked call session setup to the resource requirement for only one of the user equipments. This may reduce resource usage for forked call sessions.

19 Claims, 3 Drawing Sheets

DATA NETWORK AND METHOD FOR EXECUTING FORKING

CROSS-REFERENCE TO RELATED APPLICATION

This application claims priority from provisional application Ser. No. 61/091,823, entitled "A DATA NETWORK AND METHOD THEREFOR," and filed Aug. 26, 2008, which is commonly owned and incorporated herein by reference in its entirety.

FIELD OF THE INVENTION

The invention relates to a data network and method of operation therefor and in particular, but not exclusively to an Internet Protocol (IP) Multimedia System (IMS).

BACKGROUND OF THE INVENTION

The demands and requirements of data communication networks are becoming increasingly complex. For example, it is increasingly desired for data networks to be capable of providing efficient support for communication sessions with different Quality of Service parameters, for network mobility etc. There is furthermore a desire that this functionality is supported by popular data communication protocols such as the Internet Protocol (IP).

Indeed there is a desire for conventional data protocols such as IP to be used for an increasing number of different applications and systems.

For example, in the future evolution of cellular communication systems, it is expected that these will increasingly be based on IP traffic. For example, it is envisaged that a substantial part of the voice communication will be supported by Voice over IP (VoIP) traffic in the future. Accordingly, the 3rd Generation Partnership Project (3GPP), which is responsible for standardizing the 3rd Generation cellular communication systems, has been standardizing a network architecture that supports IP traffic. This architecture is compatible with and supplements the traditional cellular network architecture and is known as the IP Multimedia Subsystem (IMS).

The aim of IMS is not only to provide new services but also to provide all the services that the Internet provides. In addition, it is desired that users are able to execute all their services when roaming as well as from their home networks. To achieve these goals, IMS uses open standard IP protocols, defined by the Internet Engineering Task Force (IETF). As a consequence multimedia session between two IMS users, between an IMS user and a user on the Internet, and between two users on the Internet can be established using exactly the same protocol(s).

In particular, IMS uses a VoIP implementation based on a 3GPP standardized implementation of the Session Initiation Protocol (SIP) and runs over the standard Internet Protocol (IP). Existing phone systems (both packet-switched and circuit-switched) are supported.

SIP is a standard for initiating, modifying, and terminating an interactive user session that involves multimedia elements such as video, voice, instant messaging, online games, and virtual reality. SIP is only used in setting up and tearing down e.g. voice or video calls whereas the voice or video communications themselves are carried out using the Real-time Transport Protocol (RTP).

A goal for SIP is to provide a superset of the call processing functions and features present in the Public Switched Telephone Network (PSTN). As such, features that permit familiar telephone-like operations are present: e.g. dialing a number, causing a phone to ring, hearing ringback tones or a busy signal etc.

SIP also implements many more advanced call processing features. Furthermore, SIP is a peer-to-peer protocol and therefore requires only a very simple (and thus highly scalable) core network with intelligence distributed to the network edge and embedded in the endpoints (the originating or terminating devices). Many SIP features are implemented in the communicating endpoints.

IMS supports functionality for managing and controlling subscription information for the users of the system. Specifically, an IMS network comprises a Home Subscriber Server (HSS) which is a master user database that supports the IMS network entities that are actually handling the calls/sessions. These entities comprise the so-called Call Server Control Function (CSCF) elements. Specifically, a Serving-CSCF (S-CSCF) is a central node of the signaling plane and acts as a SIP server and performs session control for the user equipments served by it. Furthermore, mobility is supported by Proxy-CSCFs (P-CSCFs) which are SIP proxies that provide the first point of contact for a mobile user equipment. P-CSCFs may be located either in the visited network (e.g. in full IMS networks) or in the home network (e.g. when the visited network is not IMS compliant).

In IMS and similar systems, the SIP protocol is used to initialize call sessions between an originating node and a terminating node. This call session setup involves the originating node initializing a SIP INVITE message which is forwarded to CSCFs supporting the originating node and from these to a serving CSCF supporting the terminating node (the serving CSCP may be the same for the originating and terminating user equipment). This serving CSCF forwards the SIP INVITE message to a proxy-CSCF supporting the terminating node and from this it is forwarded to the terminating node. The terminating node may then accept the SIP INVITE and the SIP call session setup process may continue. The proxy-CSCF is furthermore coupled to a policy manager which is arranged to reserve resources for the call setup process.

However, although the approach of the SIP setup process may be advantageous in many scenarios, there are also some associated disadvantages. Specifically, in some scenarios the call session setup approach may result in a suboptimal resource usage wherein e.g. the call session setup will reserve unnecessary and unused resource for the call session.

In particular, the SIP protocol allows forking of the call sessions. A forking of a call session comprises the call session from the originating node being forked to a plurality of different potential terminating nodes. Each of these terminating nodes may accept the call session setup but the resulting call session will only be with one terminating node. Thus, the call session being setup will be between one originating node and one terminating node although the specific terminating node may be one of the plurality of possible terminating nodes. However, in current approaches, the SIP call session setup for forked call sessions will result in resource being reserved for all possible terminating nodes thereby resulting in an excessive resource usage and thus a reduced capacity of the data network as a whole.

Hence, an improved data network would be advantageous and in particular a data network that allows improved call session setup, reduced call session resource usage, facilitated operation, facilitated implementation and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a data network comprising: at least one policy manager arranged to reserve communication resource for call sessions, a plurality of proxy-call session control functions serving user equipments, each proxy-call session control function of the plurality of proxy-call session control functions being arranged to request resource reservation from an associated policy manager when initializing a call session for a user equipment served by the proxy-call session control function; a serving-call session control function arranged to: receive a first call session setup message for initializing a first call session between an originating user equipment and a terminating user identity; determine a set of terminating user equipments associated with the terminating user identity, the set of terminating user equipments having an associated set of proxy-call session control functions of the plurality of proxy-call session control functions that serve the user equipments of the set of terminating user equipments; and transmit a call session initialization message for each user equipment of the set of terminating user equipments to an associated proxy-call session control function of the set of proxy-call session control functions associated with the user equipment, the call session initialization message comprising a session identity indication for the first call session and a forking indication arranged to indicate if the first call session is a forked call session; and wherein at least one of a first proxy-call session control function of the set of proxy-call session control functions and a first policy manager supporting at least a proxy-call session control function of the set of proxy-call session control functions is arranged to restrict a combined resource reservation for a first and second user equipment of the set of terminating user equipments to a resource requirement of only one of the first and second user equipment in response to a detection that call session initialization messages for the first and second user equipment have matching session identity indications and forking indications indicative of a forked call session setup.

The invention may allow an improved data network. In particular, an improved support and performance for forking of call sessions may be achieved. In many scenarios a reduced resource reservation may be achieved for a forked call session setup. Furthermore, the approach may allow a reduced resource reservation while maintaining a low signaling overhead. Also, the improvement may in many embodiments be achieved with a low degree of modifications being introduced to existing equipment and designs. An improved backwards compatibility may be achieved.

A forked call session may be a call session wherein the set of terminating user equipments comprise a plurality of user equipments but with the first call session only including one user equipment of the set of terminating user equipments.

According to another aspect of the invention, there is provided a method of operation for a data network including at least one policy manager arranged to reserve communication resource for call sessions and a plurality of proxy-call session control functions serving user equipments, each proxy-call session control function of the plurality of proxy-call session control functions being arranged to request resource reservation from an associated policy manager when initializing a call session for a user equipment served by the proxy-call session control function; the method comprising a serving-call session control function performing the steps of: receiving a first call session setup message for initializing a first call session between an originating user equipment and a terminating user identity; determining a set of terminating user equipments associated with the terminating user identity, the set of terminating user equipments having an associated set of proxy-call session control functions of the plurality of proxy-call session control functions that serve the user equipments of the set of terminating user equipments; and transmitting a call session initialization message for each user equipment of the set of terminating user equipments to an associated proxy-call session control function of the set of proxy-call session control functions associated with the user equipment, the call session initialization message comprising a session identity indication for the first call session and a forking indication arranged to indicate if the first call session is a forked call session; and wherein at least one of a first proxy-call session control function of the set of proxy-call session control functions and a first policy manager supporting at least a proxy-call session control function of the set of proxy-call session control functions performs the step of restricting a combined resource reservation for a first and second user equipment of the set of terminating user equipments to a resource requirement of only one of the first and second user equipment in response to a detection that call session initialization messages for the first and second user equipment have matching session identity indications and forking indications indicative of a forked call session setup.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to an IMS data communication network using SIP for call session setup. However, it will be appreciated that the invention is not limited to this application but may be applied to many other data networks and call session setup protocols and procedures.

Figure 1:
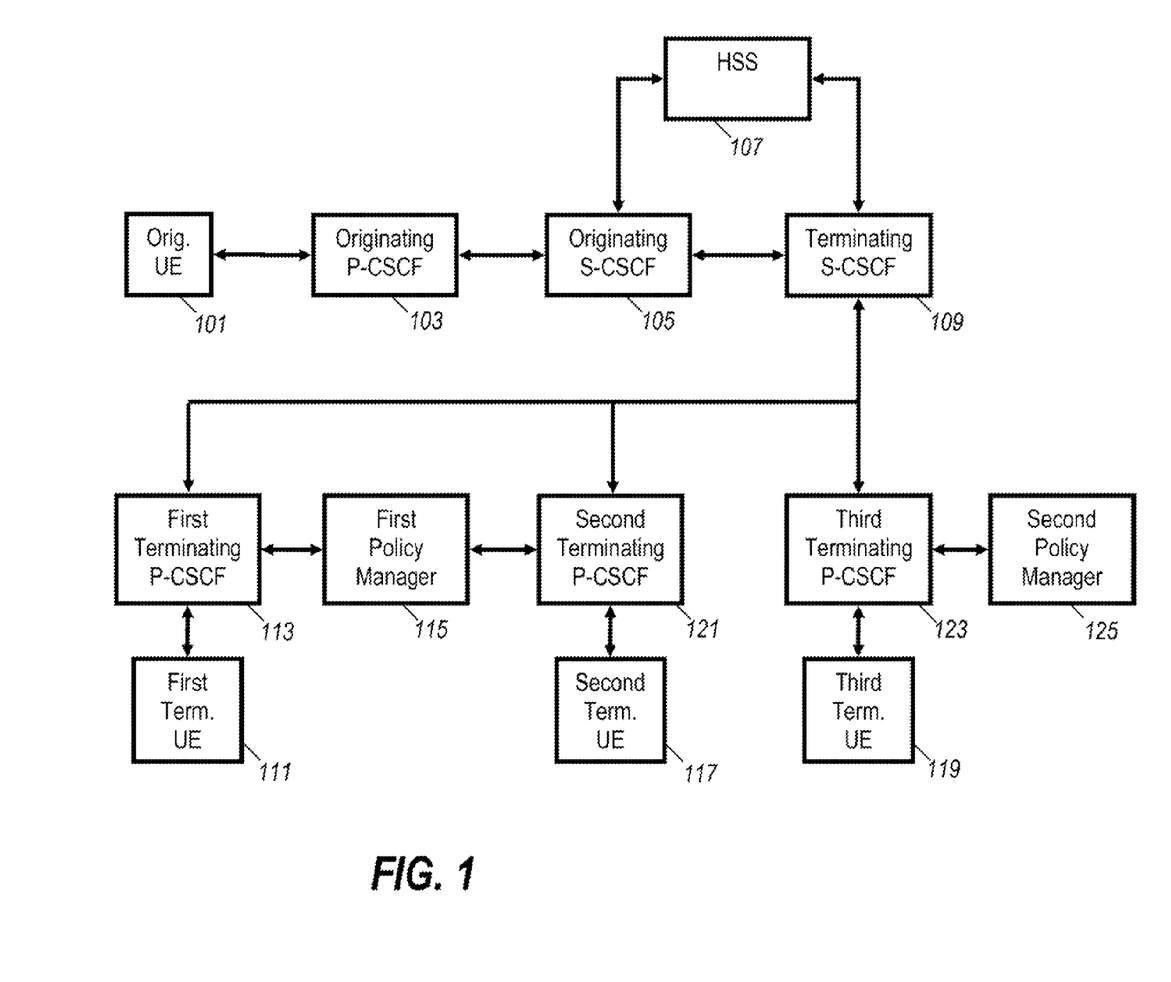
FIG. 1 illustrates an example of elements of a data network in accordance with some embodiments of the invention.

FIG. 1 illustrates an example of elements of an IMS data network. Specifically, FIG. 1 illustrates the elements associated with setting up of a call session initiated by an originating user equipment 101.

The user equipment 101 is in the specific example a mobile user equipment of a cellular communication system but it will be appreciated that the user equipment may be any node or entity capable of initiating a call session in the data network. For example, the user equipment may be a mobile phone, a remote terminal, a subscriber unit, a 3G User Equipment, a computer or any other suitable node or network element.

The user equipment is coupled to an originating P-CSCF 103 which serves the originating user equipment 101 at its current location. Thus, specifically, the originating P-CSCF 103 provides the first point of contact for the originating user equipment 101 in its current location. For example, if the originating user equipment 101 is currently served in a visited network, the P-CSCF 103 may be a P-CSCF of that visited network.

A P-CSCF is in the path of all signaling messages and can monitor and evaluate all signaling messages. Furthermore, a P-CSCF is arranged to perform a number of functions including user authentication, establishment of security associations, potentially compressing and decompressing SIP messages, and generating charging records.

It will be appreciated that the connections and the couplings between the elements of FIG. 1 may not be direct connections between the network elements but will typically be couplings and connections involving a number of intermediate network elements or even networks. Indeed, the couplings of the network elements of FIG. 1 may be considered to represent possible data flows between the elements.

In particular, it will be appreciated that the coupling between the originating user equipment 101 and the originating P-CSCF 103 illustrated in FIG. 1 may typically be an indirect coupling including a number of other elements. In particular, the coupling may comprise an access network supporting the originating user equipment 101. Specifically, the coupling may be provided by a suitable cellular access network and may comprise base stations, air interface resource controllers etc as will be well known to the person skilled in the art. It will be appreciated that the same comments are relevant to terminating user equipments.

The originating P-CSCF 103 is coupled to a Serving-CSCF (S-CSCF) 105. An S-CSCF is located in the home network of the user and acts as a SIP Registrar and stores registration information (such as a public identity). It contains the subscription-related information, performs authentication and authorization of the user, and can provide information about the physical location of a user. Thus, the S-CSCF handles SIP registrations and allows a binding of the SIP address/user identity to the current user location (e.g. the IP address) of the user equipment.

The S-CSCF does not itself store the permanent user information but rather interacts with a Home Subscriber Server (HSS) that stores such information permanently. Specifically, the S-CSCF uses Diameter Cx and Dx interfaces to the HSS to download and upload user profiles. An HSS may in many scenarios be considered to provide functionality equivalent to a GSM Home Location Register (HLR) and Authentication Center (AuC).

In the example of FIG. 1, the originating S-CSCF 105 is coupled to an HSS 107 from which the relevant user profiles are retrieved as and when these are needed.

In the example, the originating user equipment 101 initiates a call session using a SIP setup procedure. Specifically, the originating user equipment 101 generates a call session setup message which initializes the setting up of a new call session. In the example, the call session setup message is a SIP INVITE message which is sent to the originating P-CSCF 103 and from there it is forwarded to the originating S-CSCF 105.

The call session setup message comprises a terminating user identity which provides an identification of the user or subscriber who is the intended recipient for the call session setup. In the example, the terminating user identity is specifically a public user identity which is associated with a user or subscriber entity rather than with a specific user equipment. The terminating user identity may for example be a text based user identity such as sip:user@motorola.com.

In response to receiving the call session setup message, the originating S-CSCF 105 accesses the HSS 107 in order to retrieve the identity of a terminating S-CSCF 109 associated with the terminating user identity. The originating S-CSCF 105 then proceeds to forward the call session setup message (specifically the SIP INVITE message) to the terminating S-CSCF 109 identified by the HSS 107.

The terminating S-CSCF 109 is also coupled to the HSS 107. Upon registering a user equipment, the terminating S-CSCF 109 accordingly retrieves the user profile stored by the HSS 107 for the user identity. The terminating S-CSCF 109 furthermore stores information of how the individual user equipments associated with the user identity can be reached and specifically stores an IP address for each user equipment.

Accordingly, when receiving the SIP INVITE message, the terminating S-CSCF 109 proceeds to extract the terminating user identity. It then determines the current IP addresses for the user equipment(s) that are associated with this terminating user identity.

For example, a first terminating user equipment 111 may be linked to the terminating user identity and accordingly the terminating S-CSCF 109 will determine the IP address of this first terminating user equipment 111. It will then transmit a call session initialization message to the first terminating user equipment 111. Specifically, the call session initialization message may specifically be a SIP INVITE message and thus the S-CSCF may forward the received SIP INVITE message to the determined IP address.

The first terminating user equipment 111 is served by a first terminating P-CSCF 113 coupled to the terminating S-CSCF 109 and accordingly the SIP INVITE message is routed to the first terminating user equipment 111 via the first terminating P-CSCF 113. Thus, the message is first transmitted to the first terminating P-CSCF 113 and from there to the first terminating user equipment 111. In response to receiving the SIP INVITE message, the first terminating user equipment 111 returns an acknowledgement of the SIP INVITE message in the form of a SIP 18x message. This message is returned all the way to the originating user equipment 101 via the first terminating P-CSCF 113, the terminating S-CSCF 109, the originating S-CSCF 105 and the originating P-CSCF 103. It should be noted that this acknowledgement message is merely an indication that the SIP INVITE message has been received by the first terminating user equipment 111 but does not indicate that the call session setup has been accepted by the first terminating user equipment 111.

It will be appreciated that in some embodiments and scenarios, the originating S-CSCF 105 and the terminating S-CSCF 109 may be the same S-CSCF, i.e. the S-CSCF serving the originating user equipment 101 may also be serving the terminating user equipment(s) 111. For example, some data networks may contain only a single S-CSCF.

The system of FIG. 1 furthermore comprises a number of policy managers capable of managing resources in the data network. Specifically, for an IMS system, the policy managers are known as Policy Decision Functions (PDFs) and are arranged to authorize media plane resources and specifically quality of service (QoS) over the media plane. The policy managers (and specifically the PDFs) are thus used for policy control, bandwidth management, etc. Thus, when setting up a call session, one or more policy managers are involved in reserving the necessary resource to support the call session. The resource may specifically be air interface resource and backhaul resource on the user bearer path from the caller to the callee.

In an IMS system supporting a plurality of different QoS services, each P-CSCF is typically coupled to one policy manager which is arranged to perform the resource reservation for the call sessions being set-up for P-CSCF supported by that policy manager. In FIG. 1, the terminating S-CSCF 109 is coupled to a first policy manager 115 which is responsible for reserving the required resource for supporting call sessions involving the first terminating user equipment 111. In the example, the first terminating P-CSCF 113 will upon receiving the acknowledgement message (the SIP 18x message), transmit a resource reservation request to the first policy manager 115 requesting that a suitable resource is reserved for the call session. In response, the first policy manager 115 proceeds to reserve the appropriate resource and acknowledges this to the first terminating P-CSCF 113 (or if resource is not available, the request may be rejected and thereby preventing the call setup to be completed for the first terminating user equipment 111).

Similarly, when the originating P-CSCF 103 receives the SIP 18x message, it proceeds to request suitable resource for supporting the originating user equipment 101 from a policy manager (not shown) supporting the originating P-CSCF 103.

Thus, in the system, the P-CSCFs that serve the user equipments are arranged to request resource reservation from an associated policy manager when initializing a call session for a user equipment served by the P-CSCFs.

The system of FIG. 1 supports forking wherein the terminating user identity is associated with a plurality of recipients of which only one may end up being involved in the call session. For example, a user may have a user identity for which a plurality of different user equipments may be registered. E.g. a user may have a mobile phone, a home phone and a business phone that are all associated with the same user identity of the user. Accordingly, when an originating user equipment 101 generates a call setup initialization message comprising the specific terminating user identity, a call session initialization may be set-up in parallel with all three phones. However, the user will only respond using one of the user equipments and thus the call session will only be set up with one of the three possible user equipments.

Thus, in contrast to multi-casting wherein parallel call sessions may be set up with a plurality of terminating user equipments, the call session forking provides a forking of a single call session initialization message to a plurality of possible terminating user equipments but with the call session set up only being completed for one of the possible terminating user equipments.

FIG. 1 illustrates a specific example wherein three user equipments 111, 117, 119 are associated with the terminating user identity which the originating S-CSCF 105 is initializing the call session for. In the example of FIG. 1, each of the three user equipments 111, 117, 119 are served by a different terminating P-CSCF 113, 121, 123. Thus, the terminating S-CSCF 109 is coupled to the first terminating P-CSCF 113 supporting the first terminating user equipment 111, a second terminating P-CSCF 121 supporting the second terminating user equipment 117, and a third terminating P-CSCF 123 supporting the third terminating user equipment 119.

Furthermore, in the example, the first and second terminating P-CSCFs 113, 121 are supported by the same policy manager, namely the first policy manager 115, whereas the third terminating P-CSCF 123 is supported by a different second policy manager 125. Such a scenario may for example often occur if the first and second terminating user equipments 111, 117 are attached to IMS via the same access network whereas the third terminating user equipments 119 is attached via a different access network.

Thus, in the example, the terminating S-CSCF 109 will when receiving the SIP INVITE message (the call session setup message) identify a set of user equipments that are associated with the terminating user identity of the SIP message. For a non-forked call, this set may specifically comprise a single user equipment but in the scenario where the call session is associated with forking, the terminating S-CSCF 109 will identify a plurality of user equipments that are registered for the specific terminating user identity.

In the specific, example the set comprising the first, second and third user equipments 109 are identified by the terminating S-CSCF 109.

The terminating S-CSCF 109 then proceeds to forward the SIP INVITE message to the user equipments of the determined set of user equipments. Thus, in the specific example, a first SIP INVITE message is transmitted addressed to the first terminating user equipment 111, a second SIP INVITE message is transmitted addressed to the second terminating user equipment 117, and a third SIP INVITE message is transmitted addressed to the third terminating user equipment 119.

Each of the SIP INVITE messages is received by the P-CSCF supporting the specific terminating user equipment, the SIP INVITE message is addressed to. Furthermore, a SIP 18x acknowledgement message is received by each P-CSCF from the appropriate terminating user equipment.

In a conventional system supporting SIP forking, the call session setup operation of the terminating side (i.e. of the terminating S-CSCF, the terminating P-CSCFs and the user equipments) is performed separately and independently for each individual fork. Thus, in the specific example of FIG. 1, the first terminating P-CSCF 113 will proceed to request resource for the call session from the first policy manager 115, the second terminating P-CSCF 121 will proceed to request resource for the call session from the first policy manager 115, and the third terminating P-CSCF 123 will proceed to request resource for the call session from the second policy manager 115. This will result in an inefficient resource usage as the required resource is reserved for each fork despite the call session only ending up including one of these terminating user equipments 107, 117, 119. For example, backhaul resource will be reserved between the first terminating P-CSCF 113 and the terminating S-CSCF 109 for both the first terminating user equipment 111 and the second terminating user equipment 117 despite only one of these backhaul resources being required by the call session.

Specifically, in the example, the same policy manager, namely the first policy manager 115, supports two different P-CSCFs 113, 121. Thus, in the example, two of the user equipments 111, 117 are under different P-CSCFs 113, 121 which are supported by the same policy manager 115. This will in a conventional system inevitably result in duplicated resource reservation requests to the first policy manager 115 and thus to a duplicated resource reservation. Such an example may for example occur when the access network supports different access technologies with a different P-CSCF for each technology.

However, in the system of FIG. 1, the terminating S-CSCF 109 is arranged to inform the P-CSCFs that the call session initialization message (specifically the SIP INVITE message) is part of a SIP Forking. This is done by including a forking indication in the session initialization messages (in the specific example, the SIP INVTE messages) that are sent to the individual terminating user equipments 111, 117 being part of the forking. The forking indication provides an indication of whether the call session being initialized is a forked call session or a non-forked call session. The forking indication may for example be included as a new field or header in the session initialization messages, and in particular in the SIP INVITE messages.

It will be appreciated that in some embodiments, the forking indication may only be included for call session initialization messages that are for forked call sessions with no indication being included for call session initialization messages which are not part of a forked call session. In other embodiments, all call session initialization messages may include an indication that has a different value depending on whether it relates to a forked call session or not.

When receiving, a call session initialization message the terminating P-CSCFs evaluate whether it contains an indication that the call session is a forked call session. Thus, the P-CSCF can determine whether the call session should be handled as a forked call session for which there may potentially be a duplication of resource reservation or as a non forked call session. Specifically, the P-CSCFs can use this information when requesting the resource reservation from the policy manager. For example, when receiving the acknowledgment message from the terminating user equipment (e.g. the SIP 18x message), a P-CSCF message may request resource from the associated policy manager. This request can indicate whether the request is for a forked call session or not, i.e. it can indicate whether the call session initialization message contained a forking indication. This may then be used by the policy manager to evaluate if any other resource reservation requests are received with the same session identity and with an indication that the call session is a forked call session.

If so, the policy manager may proceed to allocate resource in accordance with only one of the received requests and otherwise it can proceed to reserve resource for all requests.

Figure 2:
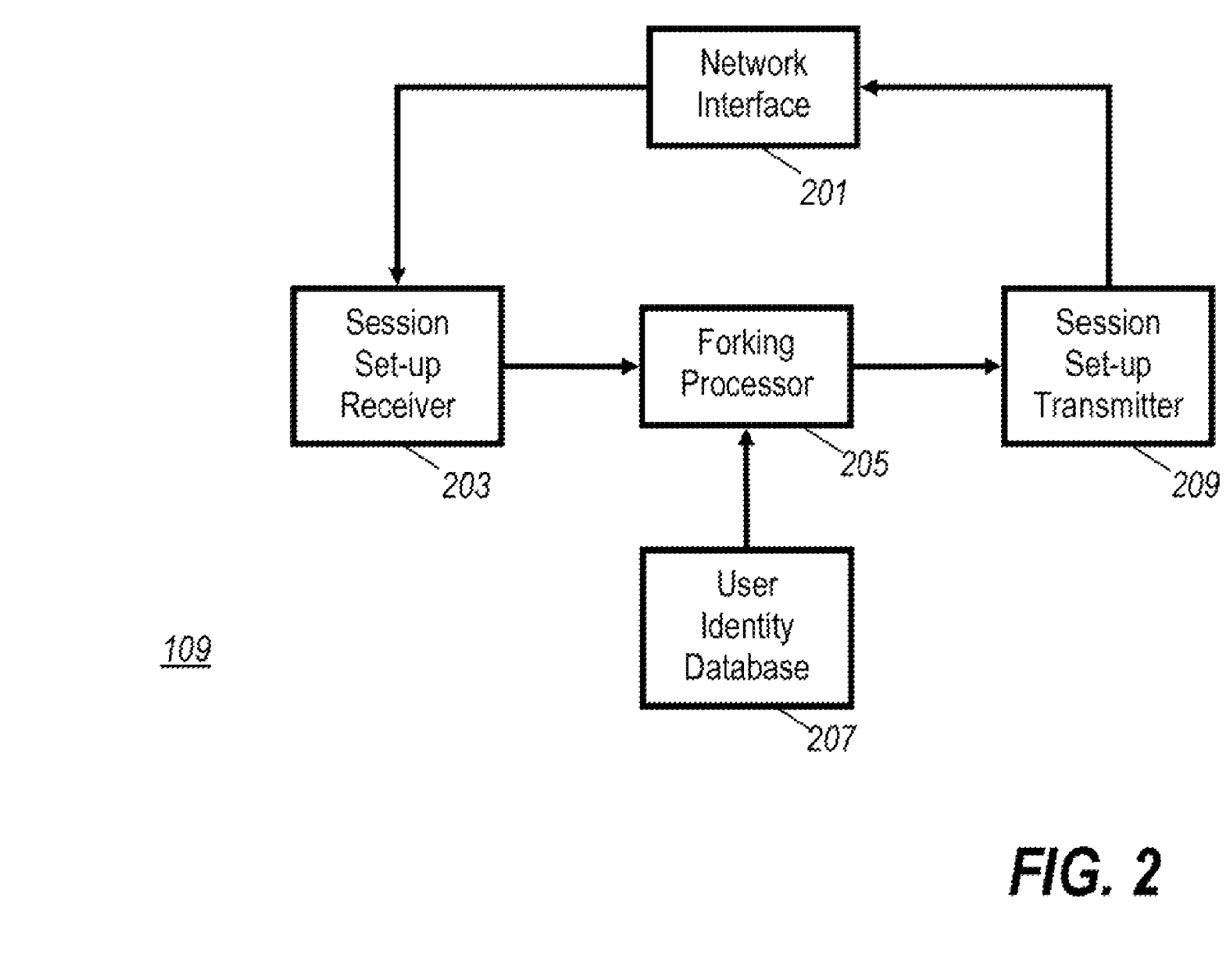
FIG. 2 illustrates an example of elements of a Serving-CSCF for a data network in accordance with some embodiments of the invention.

The specific scenario for the example of FIG. 1 will in the following be described in more detail with reference to FIG. 2 which illustrates elements of the terminating S-CSCF 109 and FIG. 3 which illustrates elements of the first policy manager 115.

The terminating S-CSCF 109 comprises a network interface 201 which interfaces the terminating S-CSCF 109 to the data network and which specifically allows the terminating S-CSCF 109 to exchange data messages with other network elements.

The network interface 201 is coupled to a session set-up receiver 203 which receives the messages that are associated with the setting up of the call session. Specifically, the session set-up receiver 203 will receive the call session setup message that is sent by the originating user equipment 101 to initialize the call session. Thus, the session set-up receiver 203 receives the SIP INVITE message generated by the originating user equipment 101 and forwarded from the originating S-CSCF 105.

The session set-up receiver 203 proceeds to extract the terminating user identity that is contained in the SIP INVITE message. The session set-up receiver 203 is coupled to a forking processor 205 which is fed the terminating user identity. The forking processor 205 is furthermore coupled to a user identity database which comprises associations or links between user identities and a set of user equipments that are linked to the user identity. The user equipments may specifically be represented by a current IP address for the user equipment and each set may comprise one or more user equipments. Thus, specifically, the user identity database 207 may store the bindings between a user identity and the current address(es) of the user equipment(s) that are currently registered for that user identity.

Thus, when the forking processor 205 receives the terminating user identity from the session set-up receiver 203, it proceeds to retrieve the information stored in the user identity database 207 for the terminating user identity. It then determines whether the call session setup request is for a forked call session or for a non-forked call session.

As an example, the forking processor 205 may simply determine that if the returned set of user equipments contains more than one user equipment, it is a forked call session and otherwise it is a non-forked call session. In other embodiments, the user identity database 207 may contain information that specifies whether a set with a plurality of user equipments represent a forked call session or e.g. may be for a multi-casting call session.

It will be appreciated that the information of the user identity database 207 may (at least partly) be information that has been downloaded from the HSS 107. Specifically, the user profile for the subscriber may be downloaded from the HSS 107 and this user profile may indicate the identities of a plurality of user equipments that should be included in the forked call session setup.

Thus, the forking processor 205 determines a set of terminating user equipments that are associated with the terminating user identity. As each terminating user equipment is served by a P-CSCF, the set of user equipments has an associated set of P-CSCFs. The set of P-CSCFs may include one or more P-CSCFs that are common for two or more user equipments of the set of user equipments (i.e. the number of different P-CSCFs may be lower than the number of forks).

In the specific example, the terminating user identity is linked to both the first terminating user equipment 111, the second terminating user equipment 117, and the third terminating user equipment 119. Thus, the SIP INVITE will result in a SIP forking call session set up involving these three user equipments 111, 117, 119.

The forking processor 205 is coupled to a session set-up transmitter 209 which is arranged to generate and transmit the messages that are associated with the set up of the call session. The session set-up transmitter 209 is fed the information of the set of user equipments and the information of whether the call session is a forked call session.

In response it proceeds to generate call session initialization messages for the user equipment(s) of the determined set. In the specific example, the call session initialization messages correspond to the received SIP INVITE message which is forwarded to each user equipment 111, 117, 118 of the set.

The call session initialization messages comprise an identification of the call session which is used to identify the call session for all the messages involved in the setup of the call session. In addition, the session set-up transmitter 209 is arranged to include a forking indication which is arranged to indicate if the first call session is a forked call session.

In the specific example, a forking indication is included in the call session initialization messages by including a flag which is not present for call session initialization messages that relate to non-forked call sessions. Specifically, a flag may be inserted in the SIP INVITE message header when a forked call session is being set up.

The session set-up transmitter 209 then transmits the call session initialization messages to the set of user equipments 111, 117, 119 via the associated set of P-CSCFs 113, 121, 123.

The call session initialization messages are received by the P-CSCFs 113, 121, 123 and are then forwarded to the user equipments 111, 117, 119.

In the example, each of the P-CSCFs 113, 121, 123 transmits a resource reservation request for the call session to the policy manager 115, 125 which is associated with the P-CSCF 113, 121, 123. Thus, the first terminating P-CSCF 113 transmits a resource reservation request to the first policy manager 115, the second terminating P-CSCF 121 also transmits a resource reservation request to the first policy manager 115 and the third terminating P-CSCF 113 transmits a resource reservation request to the third policy manager 125.

In the example, the resource reservation requests are transmitted to the policy managers 115, 125 by the P-CSCFs 113, 121, 123 when the call session instigation acknowledgement message is received from the respective user equipment 111, 117, 119. Specifically, the P-CSCFs 113, 121, 123 may transmit an AA request to the appropriate policy manager 115, 125 when the SIP 18$x$ message is received from the respective user equipment 111, 117, 119.

In the example, the P-CSCFs 113, 121, 123 include not only the session identification but also an indication of the forking indication in the resource reservation request. Specifically, the P-CSCFs 113, 121, 123 are arranged to set the field "SIP Forking AVP" of the AA request message to the value "SEVERAL_DIALOGUES" if the call session/data session is a forked call session and to the value "SINGLE_DIALOGUE" if not (or the AA request may in this case have no SIP-Forking-Indication AVP).

Figure 3:
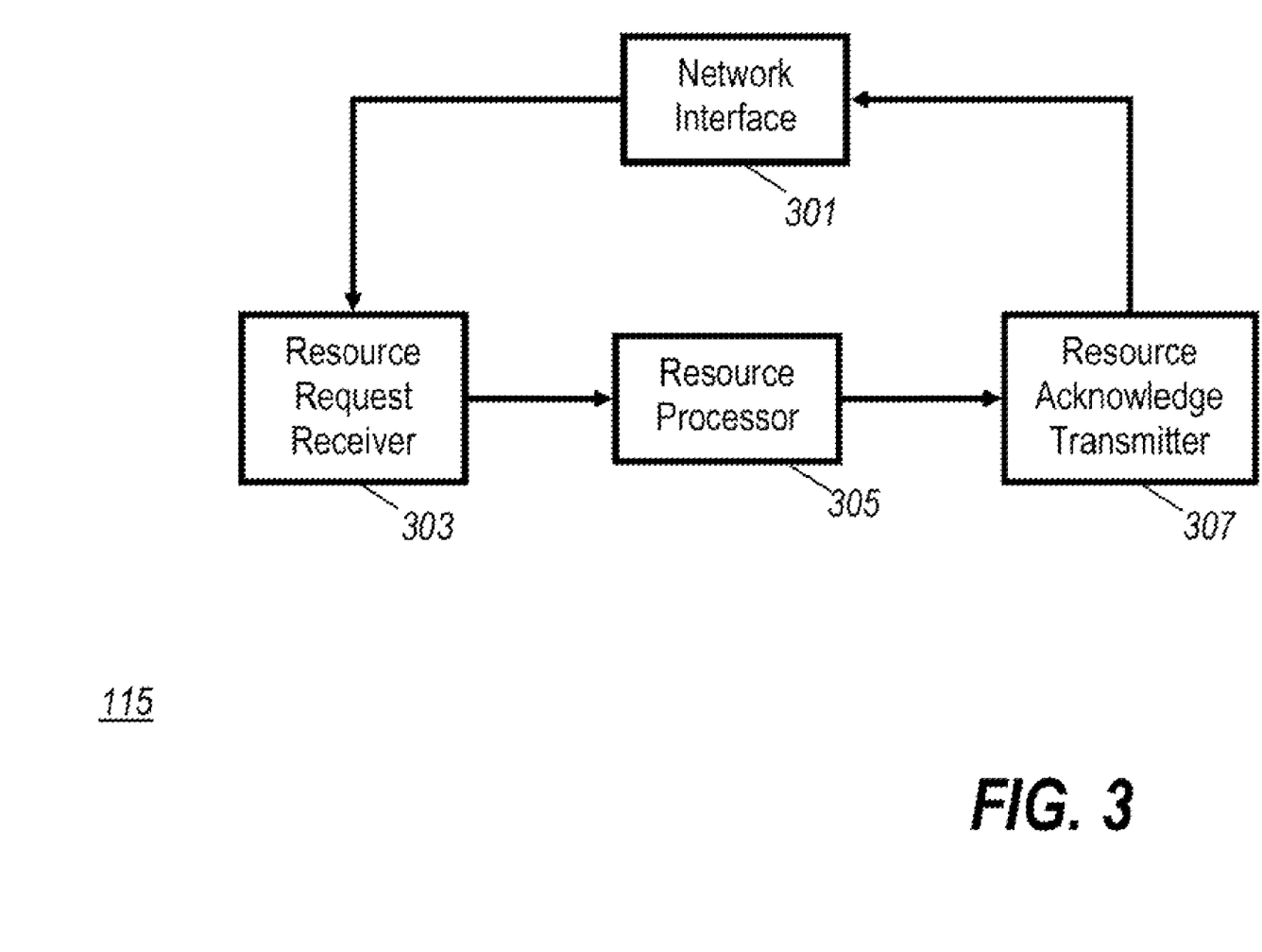
FIG. 3 illustrates an example of elements of policy manager for a data network in accordance with some embodiments of the invention.

FIG. 3 illustrates an example of some elements of the first policy manager 115. It will be appreciated that the second policy manager 125 may comprise the same functionality. In the example, the first policy manager 115 is arranged to restrict the combined resource reservation for a plurality of user equipments of the forked set to a resource requirement of only one of the plurality of user equipments in response to a detection that call session initialization messages for the plurality of user equipments have matching session identity indications and forking indications that are indicative of a forked call session setup. As the session identity indications and forking indications are represented by the corresponding values of the resource reservation requests, this test is performed by testing the corresponding data values of the resource reservation request rather than the call session initialization messages being forwarded to the first policy manager 115.

The first policy manager 115 comprises a network interface 301 which interfaces the first policy manager 115 to the data network and which specifically allows the first policy manager 115 to exchange data messages with the first and second terminating P-CSCFs 113, 121.

The first policy manager 115 comprises a resource request receiver 303 which receives the resource reservation requests from the P-CSCFs supported by the first policy manager 115 and specifically receives the two AA requests from the first and second terminating P-CSCFs 113, 121.

The resource request receiver 303 is coupled to a resource processor 305 which is arranged to reserve resource for the call sessions which are being setup. Typically, when a resource reservation request is received, the resource processor 305 reserves the amount of resource that is requested in the specific data message. However, in the specific example, the resource processor 305 is further arranged to check if there are multiple requests which are for the same forked call session. If so, only one of these resource requirements will be needed as only one of the associated user equipments will be part of the actual call session. Accordingly, the resource processor 305 checks if there are any multiple requests with the same call session identity and with a forking indication that indicates that the request is associated with a forked call session. If so, only the resource requested by one of these messages is reserved and thus the total amount of reserved resource is reduced.

Thus, in the specific example, the resource processor 305 detects that the AA requests from the first and second terminating user equipments 111, 117 both have indications that the call session is a forked call session and have matching call session identities. Accordingly, only the resource requested for either the first terminating user equipment 111 or for the second terminating user equipment 117 is reserved by the resource processor 305.

The resource processor 305 is coupled to a resource acknowledge transmitter 307 which is arranged to transmit a resource allocation message to the P-CSCFs indicating that the resource has been allocated. In the example, the resource allocation message may comprise an indication of the specific resource that has been allocated or reserved for the call session. In the scenario wherein resource is only reserved for one of the resource reservation requests because the call session is a forked call session, both (or all) of the resource reservation requests are acknowledged using the same resource allocation.

For example, the AA requests for both the first terminating user equipment 111 and the second terminating user equipment 117 are acknowledged with identical resource allocations. Accordingly, irrespective of whether the terminating user responds using the first terminating user equipment 111 or the second terminating user equipment 117, the same resource allocation will be used.

Thus, the system provides an improved call session setup for forked call sessions. In particular, the approach may prevent that unnecessary, parallel resource is reserved. Furthermore, this may be achieved with a very low overhead in terms of required additional signaling or complexity. Also, the approach provides improved resource usage for forked call sessions without impacting the possibility of using multi-casting. Specifically, for a multi-casting call session, it is in contrast to a forked call session typically necessary to reserve separate resource for each terminating user equipment. Thus, by having the S-CSCF control whether parallel resource reservations are appropriate or not, a reduced resource usage is achieved while still supporting multi-casting.

It will also be appreciated that the system allows an automatic adaptation to the specific scenario and conditions. For example, in the example of FIG. 1, the third terminating user equipment 119 is served by a third terminating P-CSCF 123 which is associated with a different policy manager 125. Accordingly, the second policy manager 125 will reserve resource independently of the first policy manager 115 resulting in parallel resource reservations for the call session. However, this is entirely appropriate as the fact that the third terminating user equipment 119 is served by a different policy manager 125 is likely to be because it is part of a different network, and therefore the call session requires resource to be reserved in this network. In other words, the approach automatically adapts so that the reservation of resource is independent for each resource domain (handled by a different policy manager) while preventing or reducing the likelihood of parallel resource reservations being made within the same resource domain (i.e. where the same resource will be used regardless of which of the terminating user equipments in that domain end up being part of the call session).

The approach specifically provides a coordination of resource reservations for user equipments that are served by different terminating P-CSCFs 113, 121 supported by the same policy manager 115.

In some scenarios, the potential resource requirement for the call session is different depending on which user equipment accepts the call session invitation. For example, the first terminating user equipment 111 may be a mobile phone which is only capable of voice communication whereas the second terminating user equipment 117 may be a computer that supports both voice and video communications.

In some embodiments, the call session instigation acknowledgement message from the user equipments may comprise an indication of the service characteristics that are supported by the user equipment. For example, in the specific example, the SIP 18x message can comprise an indication of the capabilities of the user equipment, such as e.g. whether it supports video communication or not.

In such embodiments, the P-CSCF may be arranged to determine a resource characteristic for the desired resource in response to the service characteristics. For example, if the call session is for a video or voice communication depending on the capabilities of the terminating user equipment 111, 117, 119, the first terminating P-CSCF 113 can determine the resource which is required to support a voice call, whereas the second terminating P-CSCF 121 can determine the desired resource which is required to support a video call.

An indication of the desired resource characteristic is then included in the resource reservation requests from the terminating P-CSCFs 113, 121 and the first policy manager 115 accordingly reserves the resource depending on the desired resource characteristic.

Specifically, the reserved resource may be selected as the highest resource requested in any of the resource reservation requests for the same forked call session. Thus, in the specific case, sufficient resource is reserved for a video communication.

It will be appreciated that the actual resource used (and the corresponding resource allocation) for the call session may be adapted during the call session itself. For example, the call session set up process may reserve resource for a video communication but if the call session is accepted by the first terminating user equipment 111 (resulting in a voice only communication), this resource allocation may be subsequently reduced. However, it will be appreciated that although the resource saving provided by preventing parallel reservations of resource during the call session set up process may be time limited, it may still provide a substantial benefit. In particular, for many forked call sessions, the desired resource tends to be fairly similar for all forked user equipments thereby resulting in a substantial resource saving. Furthermore, as the number of user equipments in the forked call session setup may be relatively large (e.g. 5-10 or even more user equipments) the potential resource reservation reduction may be substantial.

Thus, in the specific example of a SIP IMS implementation, the terminating S-CSCF may have to perform forking for user equipments under different P-CSCFs but connected to the same PDF. In this case, the S-CSCF shall inform the different P-CSCFs that the SIP request is forked by indicating this in a new QoS-Forking header (QoS-Forking=YES). In this case, the different P-CSCFs shall use the SIP Call-ID as the Diameter session identifier in the AA request, in order for the PDF to know that the requests from the different P-CSCFs belong to the same forked session. The P-CSCFs shall also in this case set the SIP-Forking-Indication AVP of the AA request to the value "SEVERAL_DIALOGUES".

In some embodiments, the terminating S-CSCF 109 is arranged to include the forking indication only if a plurality of the P-CSCFs have a common serving policy manager. Specifically, for P-CSCFs 113, 121 that share a policy manager 115, resource needs only to be reserved for one of the user equipments 111, 117 thereby preventing an unnecessary reservation of parallel resource. However, if none of the P-CSCFs 113, 121, 123 that are serving the user equipments 111, 117, 119 of the set of forked user equipments share a policy manager, an individual resource reservation will be made for each user equipment 111, 117, 119. Thus, in the latter case no benefit is achieved by including the forking indication. Accordingly, in such scenarios, the terminating S-CSCF 109 may not include the indication in the call session initialization messages thereby reducing the size of the messages and accordingly reducing the signaling overhead.

Thus, in some embodiments, the terminating S-CSCF 109 may determine a serving policy manager for each P-CSCF that is included in the set of P-CSCFs 113, 121, 123 supporting the forked call session. It may then proceed to only include the forking indication in call session initialization messages that are sent to P-CSCFs 113, 121 which have a shared policy manager 115.

It will be appreciated that any suitable method or procedure for determining which policy manager is associated with each P-CSCF may be used without detracting from the invention.

For example, in some embodiments the data network can include a server which stores an identification of a policy manager for each P-CSCF. In this case, the terminating S-CSCF may retrieve a policy manager identification for each P-CSCF which is included in the set of P-CSCFs which support the forked call session setup. This information may either be specifically retrieved when it is determined which specific P-CSCFs support the current call session setup or may be retrieved in advance. For example, the terminating S-CSCF 109 may retrieve the policy manager identification for any new S-CSCFs being supported by the terminating S-CSCF 109.

The server may specifically be the Home Subscription Server (HSS) 107 which can store information of which policy managers support the specific user equipments that are associated with each user identity. Thus, when the call session setup message is received, the terminating S-CSCF 109 may retrieve the policy manager identifications that are stored in the HSS 107 for the user equipments 111, 117, 119 of the terminating user identity. Thus, in such embodiments, the policy manager addresses can be configured in the HSS 107 as part of the user profile (e.g., similar to how a charging server is configured in an HSS).

In some embodiments, the terminating S-CSCF 109 can comprise a data store which statically stores associations between P-CSCFs and the policy manager identity of the policy manager which supports the P-CSCF. Thus, in such embodiments, the policy manager addresses are statically configured in the S-CSCF (in addition to the P-CSCF addresses)

In some embodiments, the terminating S-CSCF 109 is arranged to determine the serving policy manager for the P-CSCFs 113, 121, 125 in response to a policy manager identity indication which is received from the P-CSCFs 113, 121, 125 themselves. For example, at regular intervals, each P-CSCF 113, 121, 125 can send a message which provides the policy manager address of the policy manager that supports the P-CSCF 113, 121, 125. Thus, in such embodiments, each of the P-CSCFs 113, 121, 125 can inform the terminating S-CSCF 109 of the policy manager that is to be used for a user equipment served by the P-CSCF 113, 121, 125.

The information may specifically be provided in a call session setup process message which is exchanged between the P-CSCF 113, 121, 125 and the terminating S-CSCF 109 as part of the call session setup. The data may for example be provided in a new field in one of the SIP headers. For example, it may be included in a SIP REGISTER request message (as a new header or field) or part of a SIP NOTIFY message.

In the example provided above, the resource reservation reduction was provided by the policy manager evaluating resource requests and identifying unnecessary parallel resource requests. However, in other embodiments, the resource restriction for parallel call session initialization messages may be provided by the P-CSCF.

Specifically, a P-CSCF may transmit a combined resource reservation request for a plurality of user equipments to a policy manager supporting the first P-CSCF in response to a detection that received call session initialization messages for the user equipments have matching session identity indications and forking indications indicative of a forked call session setup.

For example, in a scenario wherein the second terminating user equipment 117 is also supported by the first terminating P-CSCF 113, call session initialization messages may be transmitted to the first terminating P-CSCF 113 for both the first terminating user equipment 111 and the second terminating user equipment 117. Thus, in this case the first terminating P-CSCF 113 may detect that two messages are received for the same call session (i.e. having the same call session identity) and that this is a forked call session. Accordingly, it can determine that only one resource allocation is in this case necessary and therefore it may choose to send only one resource reservation request to the first policy manager 115.

Furthermore, this resource reservation request may request that an amount of resource is reserved which corresponds to the highest resource requirement of the first terminating user equipment 111 and the second terminating user equipment 117. Thus, in the specific example wherein the SIP 18x messages returned from respectively the first terminating user equipment 111 and the second terminating user equipment 117 indicate that one user equipment may support voice calls only whereas the other user equipment may support video calls, an AA request may be transmitted to the first policy manager 115 requesting that a resource amount suitable for supporting video calls is reserved by the first policy manager 115.

Thus, the approach may reduce the amount of resource being reserved without requiring any additional evaluation or changes to the first policy manager 115.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A data network comprising:
at least one policy manager arranged to reserve communication resource for call sessions,
a plurality of proxy-call session control functions serving user equipments, each proxy-call session control function of the plurality of proxy-call session control functions being arranged to request resource reservation from an associated policy manager when initializing a call session for a user equipment served by the proxy-call session control function;
a serving-call session control function arranged to:
receive a first call session setup message for initializing a first call session between an originating user equipment and a terminating user identity;
determine a set of terminating user equipments associated with the terminating user identity, the set of terminating user equipments having an associated set of proxy-call session control functions of the plurality of proxy-call session control functions that serve the user equipments of the set of terminating user equipments; and
transmit a call session initialization message for each user equipment of the set of terminating user equipments to an associated proxy-call session control function of the set of proxy-call session control functions associated with the user equipment, the call session initialization message comprising a session identity indication for the first call session and a forking indication arranged to indicate if the first call session is a forked call session; and
wherein at least one of a first proxy-call session control function of the set of proxy-call session control functions and a first policy manager supporting at least a proxy-call session control function of the set of proxy-call session control functions is arranged to restrict a combined resource reservation for a first and second user equipment of the set of terminating user equipments to a resource requirement of only one of the first and second user equipment in response to a detection that call session initialization messages for the first and second user equipment have matching session identity indications and forking indications indicative of a forked call session setup, and wherein the serving-call session control function is arranged to determine a serving policy manager for each proxy-call session control functions of the set of proxy-call session control functions, and to include the forking indication only for proxy-call session control functions of the set of proxy-call session control functions that have a common serving policy manager.

2. The data network of claim 1 wherein each of the set of proxy-call session control functions is arranged to transmit a resource reservation request for the first call session to the first policy manager, the resource reservation request comprising an indication of the session identity and an indication of the forking indication received in the call session initialization message.

3. The data network of claim 2 wherein the first policy manager is arranged to restrict the combined resource reservation for the first and second user equipment to the resource requirement of only one of the first and second user equipment in response to a detection that resource reservation requests for the first and second user equipment have matching session identity indications and forking indications that are indicative of a forked call session setup.

4. The data network of claim 3 wherein the first and second user equipments are served by different proxy-call support control functions, the different proxy-call support control functions being served by the first policy manager.

5. The data network of claim 2 wherein each of the proxy-call session control functions of the set of proxy-call session control functions is arranged to:
transmit a call session instigation message to a served user equipment of the set of terminating user equipments, the served user equipment being served by the proxy-call session control function;
receiving a call session instigation acknowledgement message from the served user equipment, the session instigation acknowledgement message comprising an indication of service characteristics supported by the served user equipment;
determining a resource characteristic for a desired resource in response to the service characteristics; and
generating a first resource reservation request for the first call session, the first resource reservation request comprising an indication of the desired resource characteristic; and
transmitting the first resource reservation request to a serving policy manager for the proxy-call session control functions.

6. The data network of claim 5 wherein the first policy manager is arranged to determine the combined resource reservation in response to resource characteristics of a plurality of resource reservation requests received from proxy-call session control functions of the set of proxy-call session control functions.

7. The data network of claim 5 wherein the first policy manager is arranged to determine the combined resource reservation as a highest resource requirement of the resource reservation requests received from a plurality of proxy-call session control functions.

8. The data network of claim 1 further comprising a server storing an identification of a policy manager for each proxy-call session control function and the serving-call session control function is arranged to retrieve a policy manager identification for each proxy-call session control function of the set of proxy-call session control functions from the server.

9. The data network of claim 8 wherein the server is a home subscription server storing information associated with user identities and the serving-call session control function is arranged to retrieve policy manager identifications stored for the terminating user identity of the first call session.

10. The data network of claim 1 wherein the serving-call session control functions comprises a data store for statically storing associations between proxy-call session control function identities and policy manager identities.

11. The data network of claim 1 wherein the serving-call session control function is arranged to determine a serving policy manager for a first proxy-call session control function in response to a policy manager identity indication received from the first proxy-call session control function.

12. The data network of claim 11 wherein the policy manager identity indication is comprised in a call session setup process message.

13. The data network of claim 1 wherein the first proxy call session control function is arranged to transmit a combined resource reservation request for the first and second user equipments to the first police manager supporting the first proxy-call session control functions in response to the detection that call session initialization messages for the first and second user equipments have matching session identity indications and forking indications that are indicative of a forked call session setup.

14. The data network of claim 13 wherein the combined resource reservation request is indicative of a resource reservation corresponding to a highest resource requirement for the first and second user equipments.

15. The data network of claim 1 wherein the data network is an Internet Protocol, IP, Multimedia System, IMS.

16. The data network of claim 1 wherein the first call session setup is a call session setup in accordance with the Session Initiation Protocol.

17. The data network of claim 1 wherein the policy managers are Policy Definition Functions of an Internet Protocol, IP, Multimedia System, IMS.

18. The data network of claim 1 wherein the serving-call session control function is a Serving-Call Session Control Function of an Internet Protocol, IP, Multimedia System, IMS and the proxy-call session control functions are Proxy-Call Session Control Functions of the IMS.

19. A method of operation for a data network including at least one policy manager arranged to reserve communication resource for call sessions and a plurality of proxy-call session control functions serving user equipments, each proxy-call session control function of the plurality of proxy-call session control functions being arranged to request resource reservation from an associated policy manager when initializing a call session for a user equipment served by the proxy-call session control function; the method comprising a serving-call session control function performing the steps of:
receiving a first call session setup message for initializing a first call session between an originating user equipment and a terminating user identity;
determining a set of terminating user equipments associated with the terminating user identity, the set of terminating user equipments having an associated set of proxy-call session control functions of the plurality of proxy-call session control functions that serve the user equipments of the set of terminating user equipments; and
transmitting a call session initialization message for each user equipment of the set of terminating user equipments to an associated proxy-call session control function of the set of proxy-call session control functions associated with the user equipment, the call session initialization message comprising a session identity indication for the first call session and a forking indication arranged to indicate if the first call session is a forked call session; and wherein at least one of a first proxy-call session control function of the set of proxy-call session control functions and a first policy manager supporting at least a proxy-call session control function of the set of proxy-call session control functions performs the step of restricting a combined resource reservation for a first and second user equipment of the set of terminating user equipments to a resource requirement of only one of the first and second user equipment in response to a detection that call session initialization messages for the first and second user equipment have matching session identity indications and forking indications indicative of a forked call session setup, and wherein the serving-call session control function is arranged to determine a serving policy manager for each proxy-call session control functions of the set of proxy-call session control functions, and to include the forking indication only for proxy-call session control functions of the set of proxy-call session control functions that have a common serving policy manager.

* * * * *